Patented Sept. 9, 1924.

1,507,942

UNITED STATES PATENT OFFICE.

CARL TROESTER, OF BERLIN-LICHTERFELDE, AND HERMANN EMDE, OF BERLIN-LANKWITZ, GERMANY, ASSIGNORS TO CHEMISCHE FABRIK AUF ACTIEN (VORM. E. SCHERING), OF BERLIN, GERMANY.

STABLE VACCINE.

No Drawing.   Application filed May 1, 1923.   Serial No. 635,975.

*To all whom it may concern:*

Be it known that we, CARL TROESTER and HERMANN EMDE, citizens of Germany, residing at Berlin-Lichterfelde and Berlin-Lankwitz, respectively, Germany, have invented a new and useful Improvement in Stable Vaccines, of which the following is a specification.

The aqueous suspensions of bacteria used as vaccines hitherto, are known to lose by the gradual dissolution of the bacteria their efficiency, to "get aged." We have found out that the above said dissolution does not take place in presence of water soluble hexamethylenetetramine preparations. It is to be understood that the term "hexamethylenetetramine preparation" includes not only the hexamethylenetetramine itself but also its compounds, salts or complexes so far as they are soluble in water. It is suitable to produce the suspension of bacteria in solutions of a hexamethylenetetramine preparation. The vaccines thus prepared are unalterable for any length of time. The application of hexamethylenetetramine preparations yields not only this advantage but also remarkably increases the efficiency of the vaccines.

For instance a stable gonococcic vaccine is prepared by rubbing down cultures of two or three days' growth of gonococci with such a quantity of a 40 per cent solution of hexamethylenetetramine that the mixture will contain the desired number of gonococci, for instance fifty or hundred million of germs in one cubic centimeter. In this suspension the gonococci soon will die off.

The gonococci may as well be killed before mixing with the fluid. Likewise the concentration of the hexamethylenetetramine solution can be modified.

To prepare vaccines from other species of bacteria, the analogous method is employed. Instead of hexamethylenetetramine, as has been stated before, other water soluble compounds of hexamethylenetetramine may be used.

We claim as our invention:

1. As new articles of manufacture vaccines, consisting of suspensions of bacteria containing a water soluble hexamethylenetetramine preparation.

2. As new articles of manufacture vaccines, consisting of suspensions of bacteria containing hexamethylenetetramine.

3. As new articles of manufacture gonococcic vaccines containing a water soluble hexamethylenetetramine preparation.

4. As new articles of manufacture gonococcic vaccines, containing hexamethylenetetramine.

In testimony whereof we have hereunto set our signatures in the presence of two subscribing witnesses.

CARL TROESTER.
HERMANN EMDE.

Witnesses
G. HOLZERMAN,
ROGER T. AUSPACE.